United States Patent
Franco et al.

(10) Patent No.: US 7,233,456 B2
(45) Date of Patent: Jun. 19, 2007

(54) METHOD FOR ELIMINATING THE NEED FOR A DEDICATED LANDING ZONE AT THE OUTER DIAMETER OF A STORAGE SYSTEM'S PLATTER

(75) Inventors: Luis Franco, Gilroy, CA (US); Oscar Ruiz, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/982,488

(22) Filed: Nov. 5, 2004

(65) Prior Publication Data

US 2006/0098325 A1  May 11, 2006

(51) Int. Cl.
G11B 21/02 (2006.01)

(52) U.S. Cl. .................................................. 360/75
(58) Field of Classification Search ................. 360/75, 360/97.02, 294.7, 235.2, 236.2, 77.02, 97.01
See application file for complete search history.

(56) References Cited

U.S. PATENT DOCUMENTS

| | | | |
|---|---|---|---|
| 4,005,485 A | | 1/1977 | Opocensky |
| 4,814,907 A | * | 3/1989 | Goor ........................... 360/75 |
| 4,843,502 A | | 6/1989 | Tagawa |
| 4,918,556 A | * | 4/1990 | Ezaki et al. ............. 360/97.02 |
| 4,954,904 A | * | 9/1990 | Goor ........................ 360/294.7 |
| 5,315,454 A | | 5/1994 | Fukakusa |
| 5,870,255 A | | 2/1999 | Hornung et al. |
| 6,002,552 A | | 12/1999 | Leung |
| 6,239,935 B1 | * | 5/2001 | Shrinkle ..................... 360/75 |
| 6,243,222 B1 | | 6/2001 | Boutaghou et al. |
| 6,292,333 B1 | | 9/2001 | Blumentritt et al. |
| 6,301,080 B1 | | 10/2001 | Boutaghou |
| 6,381,098 B1 | * | 4/2002 | Boutaghou et al. ...... 360/235.2 |
| 6,388,832 B1 | | 5/2002 | Dobbek et al. |
| 6,680,811 B2 | | 1/2004 | Gillis et al. |
| 6,680,821 B2 | * | 1/2004 | Kang ....................... 360/236.2 |
| 6,693,761 B2 | | 2/2004 | Ishii et al. |
| 6,707,646 B2 | * | 3/2004 | Berger et al. ............ 360/294.7 |
| 6,714,377 B2 | | 3/2004 | Bement et al. |

(Continued)

FOREIGN PATENT DOCUMENTS

JP  52067307  6/1977

(Continued)

OTHER PUBLICATIONS

Qing-Hua Zeng and David B. Bogy. "Effects of Certain Design Parameters on Load/Unload Performance" IEEE MAG-36 n.1, pp. 140ff.

(Continued)

Primary Examiner—Fred F. Tzeng

(57) ABSTRACT

Embodiments of the present invention pertain to a method for loading a slider that eliminates the need for a dedicated landing zone at the outer diameter of a platter. In one embodiment, a slider is lowered from a ramp, which is positioned in close proximity to the outer diameter of a platter, and positioned at an initial fly height above the platter without requiring the dedicated landing zone at the outer diameter. The slider is moved towards an inner diameter of the platter. The slider is positioned at an operating fly height above the platter when the slider reaches a certain position relative to the inner diameter.

18 Claims, 4 Drawing Sheets

U.S. PATENT DOCUMENTS

| | | |
|---|---|---|
| 6,721,121 B1 * | 4/2004 | Schreck et al. .......... 360/77.02 |
| 6,798,613 B1 * | 9/2004 | Krajnovich et al. ..... 360/97.01 |
| 6,850,382 B2 * | 2/2005 | Fayeulle et al. .............. 360/75 |
| 6,937,419 B2 * | 8/2005 | Suk et al. ..................... 360/75 |
| 2002/0126418 A1 | 9/2002 | Ueno et al. |

FOREIGN PATENT DOCUMENTS

| | | |
|---|---|---|
| JP | 4325960 | 11/1992 |
| JP | 4325974 | 11/1992 |

OTHER PUBLICATIONS

Keiji Aruga et al. "Vibro-Loading of Magnetic Head Assemblies for Hard Disk Drives" IEEE MAG-30 n.6, pp. 4161ff.

"LSL" Disclosure IPCOM000014765D.

* cited by examiner

METHOD FOR ELIMINATING THE NEED FOR A DEDICATED LANDING ZONE AT THE OUTER DIAMETER OF A STORAGE SYSTEM'S PLATTER

TECHNICAL FIELD

Embodiments of the present invention relate to storage systems. More specifically, embodiments of the present invention relate to loading a slider associated with the storage system.

BACKGROUND ART

Frequently, a storage system includes one or more storage devices for storing data on magnetic or optical storage media. For example, a magnetic storage system can be a direct access storage device (DASD) or a hard disk drive (HDD) and include one or more platters and a disk controller to manage operations on the platters. The platters are frequently made of aluminum alloy or a mixture of glass and ceramic with a magnetic coating. The platters can be stacked vertically on a spindle by placing the spindle in the center of the platters. The spindle can be turned by a motor at velocities ranging from three to fifteen thousand revolutions per minute.

Typically an HDD uses an actuator assembly for positioning read/write heads at the desired location of a platter to read data from and/or write data to a platter. The read/write heads can be mounted on what is known as a slider. Generally, a slider provides mechanical support for a read/write head and electrical connections between the head and the drive.

During drive operation the surface of a platter can be damaged possibly resulting in a loss of data. One possible source of damage to the platter can result from a read/write head coming into contact with the surface of the platter. The rotation of a platter around the spindle causes air to move beneath a slider. The slider can glide over the moving air at a uniform distance above the surface of the rotating platter, thus, avoiding contact between the read/write head and the surface of the platter.

The slider includes a pattern of protrusions (air bearing design) on the air bearing surface (ABS) of the slider, which enables the slider to "fly" at a desired height above a platter. A slider can be coupled to a suspension to form a head gimbal assembly (HGA). The HGA can be coupled to an actuator arm, which is a part of an actuator assembly, to move and support the HGA.

FIG. 1 depicts a prior art storage system for reading data from and/or writing data to a storage medium that requires a dedicated landing zone at the outer diameter. For example, as depicted in FIG. 1, the storage system 100 includes a platter 125, a slider 110, a suspension 115, and a ramp 105. The platter 125 has a center 120, an outer diameter 130, an inner diameter 140, and a dedicated landing zone 135. The platter 125 can be mounted on a spindle at its center 120. The slider 110 is coupled to the suspension 115 and has an air bearing surface 112 (ABS) for reading data from and writing data to the platter 125. The slider 110 is depicted at an operating fly height 145.

When a storage system 100, such as a disk drive, is off, the platter 125 associated with the storage system 100 is not rotating and the slider is "parked," for example, on a ramp 105. When a read or write operation is initiated, the platter 125 begins to rotate. The slider 110 exits 107 its parked position on the ramp 105 and is positioned at a height 145 above the platter 125 at which the read/write head can read data from or write data to the platter 125. This height 145 shall be referred to as the operational fly height 145. The process of positioning the slider 110 at the operating fly height 145 is frequently referred to as "loading" the slider 110 or simple as a "load process." When an operation, such as reading or writing data, has been completed, the slider 110 can be parked, for example, on the ramp 105. The process of parking the slider 110 on the ramp 105 is commonly referred to as "unloading" the slider 110 or simple as an "unload process."

Unloading and loading the slider 110 are critical operations as there is a danger that the read/write heads may come into contact with the platter 125 resulting in damage to the platter 125's surface. To prevent damage, a dedicated landing zone 135 is associated with the outer diameter 130 of the platter 125 where no data is written to. Thus, no data will be lost in the event that the read/write head comes into contact with the surface of the platter 125. However, using a dedicated landing zone 135 at the OD 130 results in a reduction of approximately 7% of the amount of data that could have been stored on the platter 125.

For these and other reasons, a method for loading a slider that eliminates the need for a dedicated landing zone at the outer diameter of a platter would be valuable.

DISCLOSURE OF THE INVENTION

Embodiments of the present invention pertain to a method for loading a slider that eliminates the need for a dedicated landing zone at the outer diameter of a platter. In one embodiment, a slider is lowered from a ramp, which is positioned in close proximity to the outer diameter of a platter, and positioned at an initial fly height above the platter without requiring the dedicated landing zone at the outer diameter. The slider is moved towards an inner diameter of the platter. The slider is positioned at an operating fly height above the platter when the slider reaches a position relative to the inner diameter.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

Figure 2:
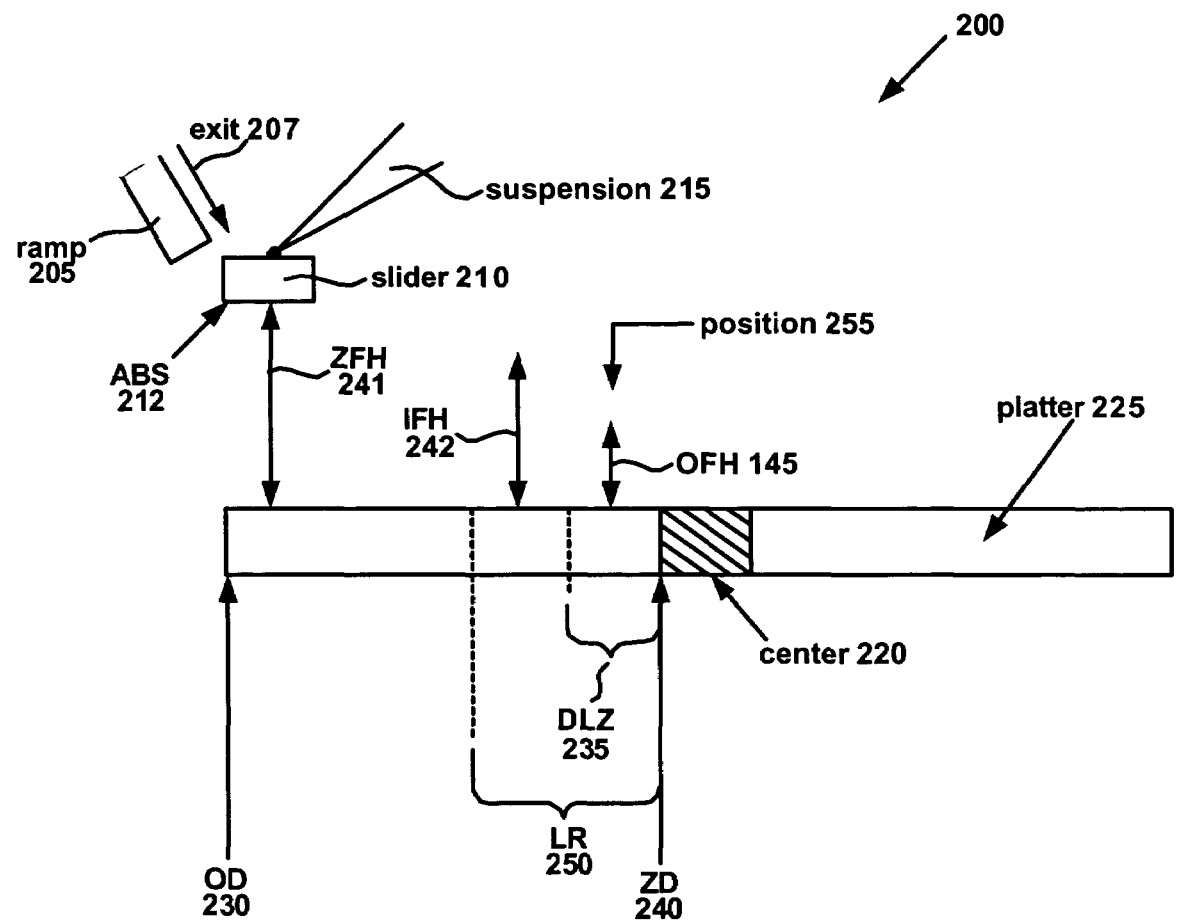
FIG. 2 is a block diagram of a method for loading a slider that eliminates the need for a dedicated landing zone at the outer diameter of a platter, according to embodiments of the present invention.

FIG. 2 is a block diagram of a method for loading a slider that eliminates the need for a dedicated landing zone at the outer diameter of a platter, according to embodiments of the present invention. The blocks in FIG. 2 can be arranged differently than as illustrated, and can implement additional or fewer features than what are described herein. Further, the features represented by the blocks can be combined in various ways.

As depicted in FIG. 2, storage system 200 includes a platter 225, a slider 210, a suspension 215, and a ramp 205. The platter 225 has a center 220, an outer diameter 230, an inner diameter 240, a loading region 250, and an optional dedicated landing zone 235 in close proximity to the inner diameter 240 of the platter 225. The platter 225 can be mounted on a spindle at its center 220. The slider 210 is coupled to the suspension 215 and has an ABS 212 for reading data from and writing data to the platter 225. The slider 210 is depicted at an initial fly height 241. FIG. 2 depicts two other fly heights, an operational fly height 145 and an intermediate fly height 242.

A two phase approach can be used, for example, to load the slider 210 where in the first phase the slider 210 can be positioned at an initial fly height 241 after exiting 207 the ramp 205 and in the second phase the slider 210 can be positioned at the operating fly height 145, for example, after the slider 210 is moved toward the inner diameter 240. The slider 210 can be positioned at an intermediate fly height 242, that is less than the initial fly height 241 and greater than the operating fly height 145, as the slider 210 is being moved toward the inner diameter 240, for example. According to one embodiment, one way of attaining multiple fly heights, such as fly heights 241, 242, 145, is to use multi-stability properties associated with the air bearing properties of the slider 210, the suspension 214, etc. For example, the fly heights can be controlled, at least in part, by factors such as the design of the ABS 212, velocity, air flow, force, moment, and/or air pressure, among other things, as will become more evident.

Since the circumference of the platter 225 at the outer diameter 230 is greater than the circumference of the platter 225 at the inner diameter 240, a greater number of bits can be stored at the outer diameter 230 than at the inner diameter 240. Since, according to embodiments of the invention, the slider 210 is loaded at the inner diameter 240 instead of at the outer diameter 230, a dedicated landing zone 135 (FIG. 1) is not required at the outer diameter 230. According to one embodiment, the dedicated landing zone 235 at the inner diameter 240 is optional as will become more evident.

Fly Heights

The initial fly height 241 can be controlled to be high enough to cause, at least in part the slider 210 to lower to the operating fly height 145 at a position 255 relative to the inner diameter 240, according to one embodiment. For example, the initial fly height 241 can range from approximately 300 to 1000 nm (nanometers). Typically, the operating fly height 145 is approximately 10 nm. According to another embodiment, the intermediate fly height 242 can be approximately $\frac{1}{5}^{th}$ that of the initial fly height 241. For example, if the initial fly height 241 was 300 nm, then the intermediate fly height 242 can be approximately 60 nm. Similarly, if the initial fly height 241 was 1000 nm, then the intermediate fly height 242 can be approximately 200 nm. The fly heights can be controlled, at least in part, by factors such as the design of the ABS 212, velocity, air flow, force, moment, and/or air pressure, among other things, as will become more evident.

Velocity

The velocity is greater at the outer diameter 230 than at the inner diameter 240 because the circumference of the platter 225 is greater at the outer diameter 230 than the circumference at the inner diameter 240. In fact, the decrease in velocity from the outer diameter 230 to the inner diameter 240 is typically linear. As the slider 210 is moved from the outer diameter 230 toward the inner diameter 240, the amount of air flowing beneath the slider 210 decreases due to the drop in velocity resulting in the slider 210 being positioned at a lower flying height as the slider 210 moves toward the inner diameter 240. This decrease in the air flowing beneath the slider 210 as the slider 210 moves towards the inner diameter 240 can be used to lower the slider 210 to an intermediate fly height 242, for example, and ultimately position the slider 210 at the operating fly height 145. The speed at which the spindle spins does not have to be varied in order to result in the slider 210 lowering from the initial flying height to the operating flying height, according to one embodiment.

Figure 1:
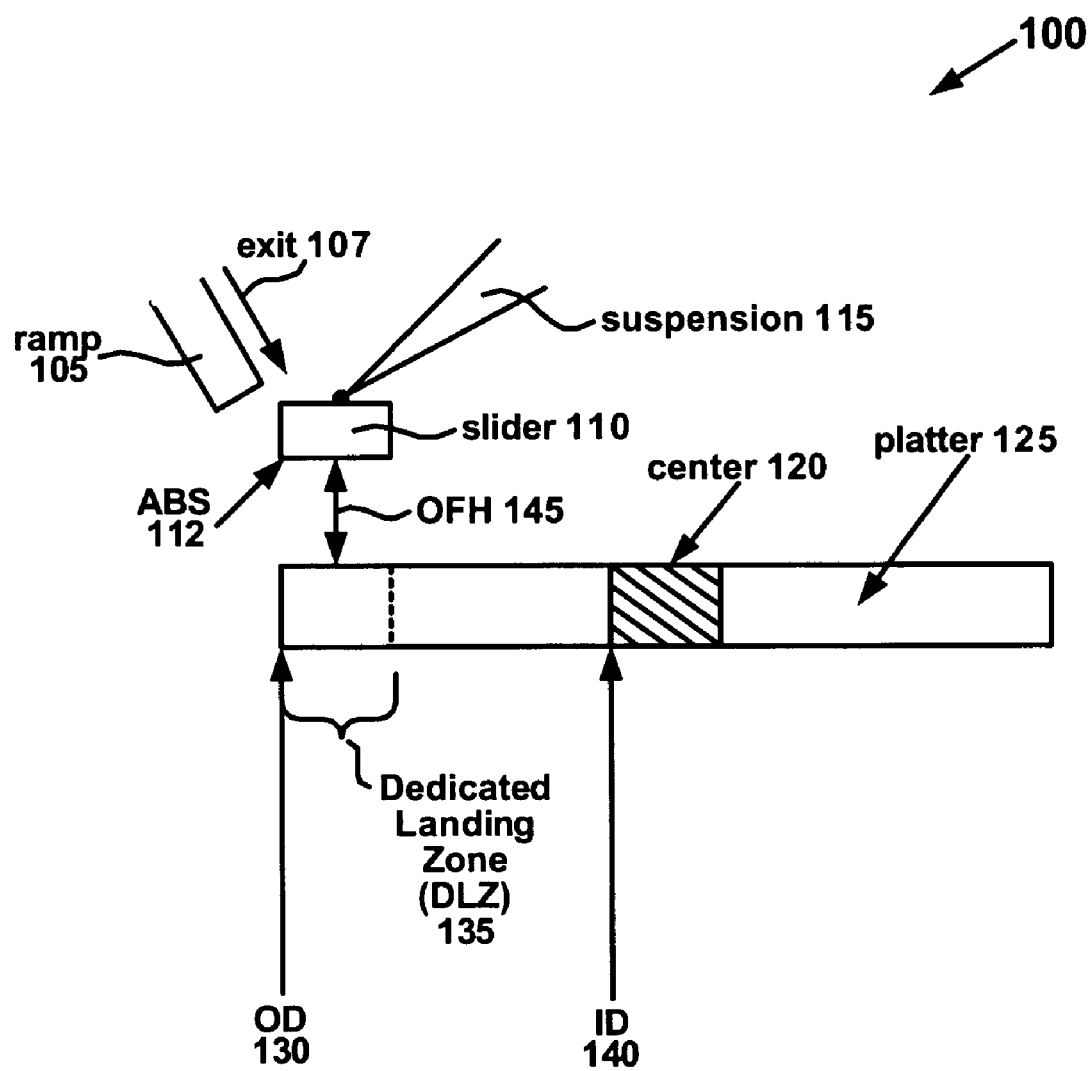
FIG. 1 depicts a prior art storage system for reading data from and/or writing data to a storage medium that requires a dedicated landing zone at the outer diameter.

In the prior art approach of exiting 107 the ramp 105 and loading at the OD 130 depicted in FIG. 1 results in the slider 110 oscillating up and down due to the fast velocity found at the outer diameter 130. In contrast, since the slider 210 is positioned at the operating fly height 145 (e.g., "loaded") at a position 255 relative to the inner diameter 240, according to embodiments of the present invention, where the velocity is less than at the outer diameter 230, the slider 210 can transition smoothly (e.g., with few if any oscillations up and down) from the initial fly height 241 to the operating fly height 145.

Force and Moment

Figure 3:
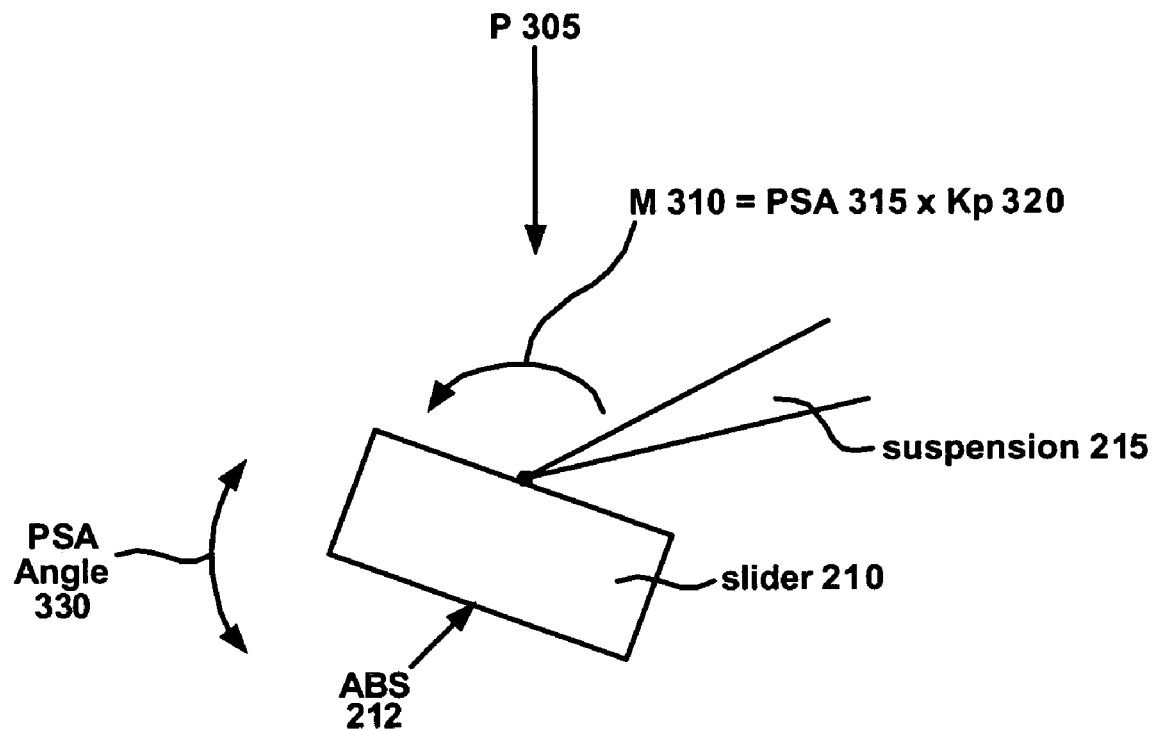
FIG. 3 depicts the force and moment applied to a slider coupled to a suspension, according to embodiments.

FIG. 3 depicts the force and moment applied to a slider coupled to a suspension, according to embodiments. The amount of pressure that a suspension 215 applies to the slider 210 is known as force 305 or "gram load." The force 305 that the suspension 215 applies to the top of the slider 210 can be used to counter balance the lift that results from the air flowing beneath the slider 210 to achieve a desired fly height. According to one embodiment, the force 305 that is applied to the slider 210 ranges from 1 gram to 2 grams. Pitch static attitude 315 (PSA) is an angle 330 along the vertical axis. Moment 310 is the product of PSA 315 and pitch stiffness 320 (Kp). According to another embodiment, the PSA 315 ranges (330) from 0 to 2.5 degrees. According to a preferred embodiment, the PSA 315 ranges (330) from 1 to 2 degrees.

The initial fly height 241 and the operating fly height 145 can be controlled, at least in part, by manufacturing components, such as the suspension 215, to deliver a particular force 305 and/or a particular moment 305 to the slider 210, according to one embodiment.

Air Pressure

According to another embodiment, air pressure can be used, at least in part, to cause the slider 210 to drop from the initial fly height 241 to the operating fly height 145. For example, a mechanism that controls air pressure can be used to cause the air pressure surrounding the slider 210 to decrease. This air pressure mechanism can be a part of a storage system 200 or be separate but attached to the storage system 200. When the slider 210 reaches a certain position 255 relative to the inner diameter 240, the mechanism can cause the air pressure to decrease resulting in the slider 210 being lowered to the operating fly height 145.

The Dedicated Landing Zone And The Loading Region

According to one embodiment, the optional dedicated landing zone 235 can be in close proximity to the inner diameter 240. According to another embodiment, the optional dedicated landing zone 235 can be adjacent to the inner diameter 240. As already stated, according to one embodiment, the dedicated landing zone 235 is optional. For example, it may be possible to use velocity, force, moment, and/or ambient pressure, etc., or any combination thereof, to control the loading of the slider 210 so that the dedicated landing zone 235 is not needed. According to one embodiment, the dedicated landing zone 235 can range from 1 to 1.5 times the width of a slider 210. The empirical method of building storage devices and testing the storage devices can be used to determine if a dedicated landing zone 235 is desirable. For example, storage systems 200 can be built with components, such as a slider 210, a suspension 215, etc., with known tolerances for factors such as, ABS 212 design, velocity, force 305, moment 310, air pressure, etc., and tested to determine if a dedicated landing zone 235 would be desirable.

If it is determined that a dedicated landing zone 235 is not needed, a loading region 250 can be used instead, according to one embodiment. Unlike the dedicated landing zone 235, data can be stored anywhere in the loading region 250. The loading region 250 can be used to designate an area anywhere in which the slider 210 can be positioned at the operating fly height 145, for example, by lowering the slider 210 to the operating fly height 145. The loading region 250 can be in close proximity to the inner diameter 240, according to one embodiment. According to another embodiment, the loading region 250 can be adjacent to the inner diameter 240. The loading region 250 can be approximately 50% to 80% of the platter 225's surface, according to one embodiment. A Monte Carlo simulation can be used to determine the tolerances that can be allowed for various factors, such as gram load (e.g., force 305), moment 310, pitch stiffness 320, PSA 315, ABS 212 design, etc., given the velocity for a storage device 200 to determine the size of the loading region 250.

OPERATIONAL EXAMPLE

Figure 4:
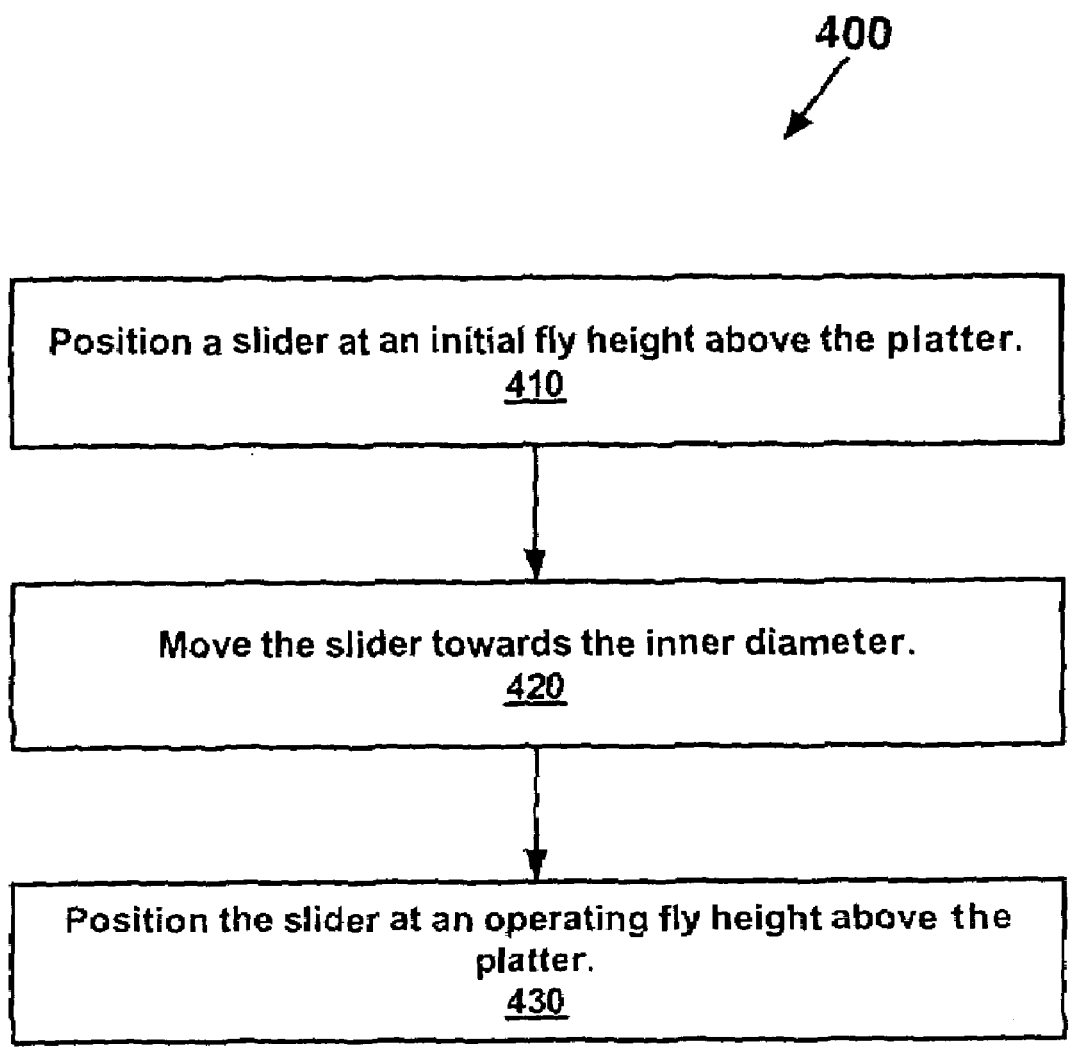
FIG. 4 depicts flowchart 400 for a method of loading a slider that eliminates the need for a dedicated landing zone at the outer diameter of a platter, according to embodiments of the present invention.

FIG. 4 depicts flowchart 400 for a method of loading a slider that eliminates the need for a dedicated landing zone at the outer diameter of a platter, according to embodiments of the present invention. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed. A For the purposes of illustration, the discussion of flowchart 400 shall refer to the structures depicted in FIGS. 2 and 3.

Initially the slider 210 can exit 207 a ramp 205 that the slider 210 was parked on, for example. The slider 210 can be positioned at an initial fly height 241 above the platter 225 (410). For example, the slider 210 can be positioned at an initial fly height 241 of approximately 300–1000 nm above the platter 225. The slider 210 can be moved towards the inner diameter 240 of the platter 225 (420). The actuator can be used to move the slider 210 towards the inner diameter 240. According to one embodiment, the slider 210 can be positioned at an intermediate fly height 242, for example, due to decreasing velocity as the slider is moved towards the inner diameter 240 (420). When the slider 210 reaches a certain position 255 relative to the inner diameter 240, the slider 210 can be positioned at an operating fly height 145 so that a read/write head associated with the slider 210 can operate on the platter 225, for example, by reading data from and/or writing data to the platter 225 (430). The operating fly height 145 can be approximately 10 nm. The operating fly height 145 can be maintained while moving the slider 210 horizontally, for example, to read or write data from any position on the platter 225.

CONCLUSION

There are prior art solutions that park a slider on the surface of the platter, instead of a ramp, when not performing an operation. In this case, the platter is not spinning when the slider is parked. When an operation is initiated, the platter starts to spin resulting in the slider adhering to the surface of the platter. Additional power is required to overcome the force that results from the slider adhering to the surface of the platter. In contrast, since embodiments of the present invention, park the slider 210 on a ramp 205, the slider 210 will never adhere to the surface of the platter 225, thus, extra power will never be required to overcome the slider 210 adhering to the platter 225's surface.

Although a ramp that extends from the outer diameter to the inner diameter could be used for loading a slider onto a platter at the inner diameter, as is the case with some prior art storage systems, such a mechanism could only be used to load a slider on one side of the platter. Further, the ramp would have to be retracted after the slider is loaded in order for the read/write head to operate (e.g., read from and/or write to) on the platter.

Although embodiments were described herein with one platter 225 and one slider 210 for operating on one side of the platter 225, embodiments described herein can be used with a slider, for example, operating on both sides of a platter 225. Further, embodiments described herein can use multiple platters with a slider operating on one side of each platter or with sliders operating on both sides of each platter.

Although embodiments herein have been described with reference to positioning a slider in relation to a platter, for example, embodiments herein can also be used for determining the changes in an environment, such as changes in velocity, air pressure, etc. by detecting that a first component has changed positions from a first height to a second height in relation to a second component.

What is claimed is:

1. A method for eliminating the need for a dedicated landing zone at an outer diameter of a platter, the method comprising:

positioning a slider at an initial fly height above the platter without requiring the dedicated landing zone at the outer diameter of the platter, wherein the slider is lowered from a ramp to the initial fly height and wherein the ramp is positioned in close proximity to the outer diameter;

moving the slider towards an inner diameter of the platter;

positioning the slider at an intermediate fly height above the platter at some point in time during the moving of the slider towards the inner diameter; and positioning the slider at an operating fly height above the platter when the slider reaches a position relative to the inner diameter of the platter, wherein the intermediate fly height is a height above the platter that is between the initial fly height and the operating fly height and wherein a head associated with the slider operates on the platter; and wherein the positioning of the slider at the initial fly height that is 400 nm.

2. The method as recited in claim 1, wherein the positioning the slider at the operating fly height further comprises:

using a velocity associated with the spinning of the platter to cause the slider to be lowered from the initial fly height to the operating fly height.

3. The method as recited in claim 1, wherein:

the positioning of the slider at the initial fly height further comprises using a force delivered to the slider to control, at least in part, the positioning of the slider at the initial fly height; and the positioning of the slider at the operating fly height further comprises using the force delivered to the slider to control, at least in part, the positioning of the slider at the operating fly height.

4. The method as recited in claim 3, wherein the force ranges from approximately 1 gram to 2 grams.

5. The method as recited in claim 1, wherein:

the positioning of the slider at the initial fly height further comprises using a moment delivered to the slider to control, at least in part, the positioning of the slider at the initial fly height; and the positioning of the slider at the operating fly height further comprises using the moment delivered to the slider to control, at least in part, the positioning of the slider at the operating fly height.

6. The method as recited in claim 5, wherein the moment is a product of pitch static attitude (PSA) and pitch stiffness (Kp).

7. The method as recited in claim 6, wherein the PSA ranges from approximately 0 degrees to 2.5 degrees.

8. The method as recited in claim 7, wherein the PSA ranges from approximately 1 to 2 degrees.

9. The method as recited in claim 1, wherein the positioning the slider at the operating fly height further comprises:

lowering ambient pressure around the slider to cause the slider to lower to the operating fly height.

10. The method as recited in claim 1, wherein:

the positioning of the slider at the initial fly height further comprises using a slider with air bearing properties designed in a manner that controls the positioning of the slider at the initial fly height; and the positioning of the slider at the operating fly height further comprises using the slider with the air bearing properties designed in a manner that controls the positioning of the slider at the operating fly height.

11. The method as recited in claim 10, wherein the air bearing properties are determined, at least in part, by a design of the air bearing surface of the slider.

12. The method as recited in claim 1, wherein operates on the platter is selected from a group consisting of reading data from the platter and writing data to the platter.

13. The method as recited in claim 1, wherein the positioning the slider at the intermediate fly height further comprises:

positioning the slider at the intermediate fly height that ranges from approximately 60 nanometers (nm) to 200 nm.

14. The method as recited in claim 1, further comprising:

associating a different dedicated landing zone in close proximity to the inner diameter, wherein the different dedicated landing zone is approximately 1.5 times the width of the slider.

15. The method as recited in claim 14, wherein the different dedicated landing zone is adjacent to the inner diameter.

16. The method as recited in claim 15, wherein the positioning the slider at the operating fly height above the platter further comprises:

positioning the slider at the operating fly height at a loading region that is adjacent to the inner diameter.

17. The method as recited in claim 15, wherein positioning of the slider at the operating fly height at the loading region further comprises:

positioning the slider at the operating fly height at the loading region, wherein the width of the loading region ranges from approximately 50% to 80% the width of the surface of the platter.

18. The method as recited in claim 1, wherein the positioning of the slider at the operating fly height above the platter further comprises:

positioning the slider at the operating fly height at a loading region that is in close proximity to the inner diameter.

* * * * *